No. 784,015. PATENTED FEB. 28, 1905.
T. L. & T. J. STURTEVANT.
VEHICLE BRAKE.
APPLICATION FILED SEPT. 3, 1904.
2 SHEETS—SHEET 1.
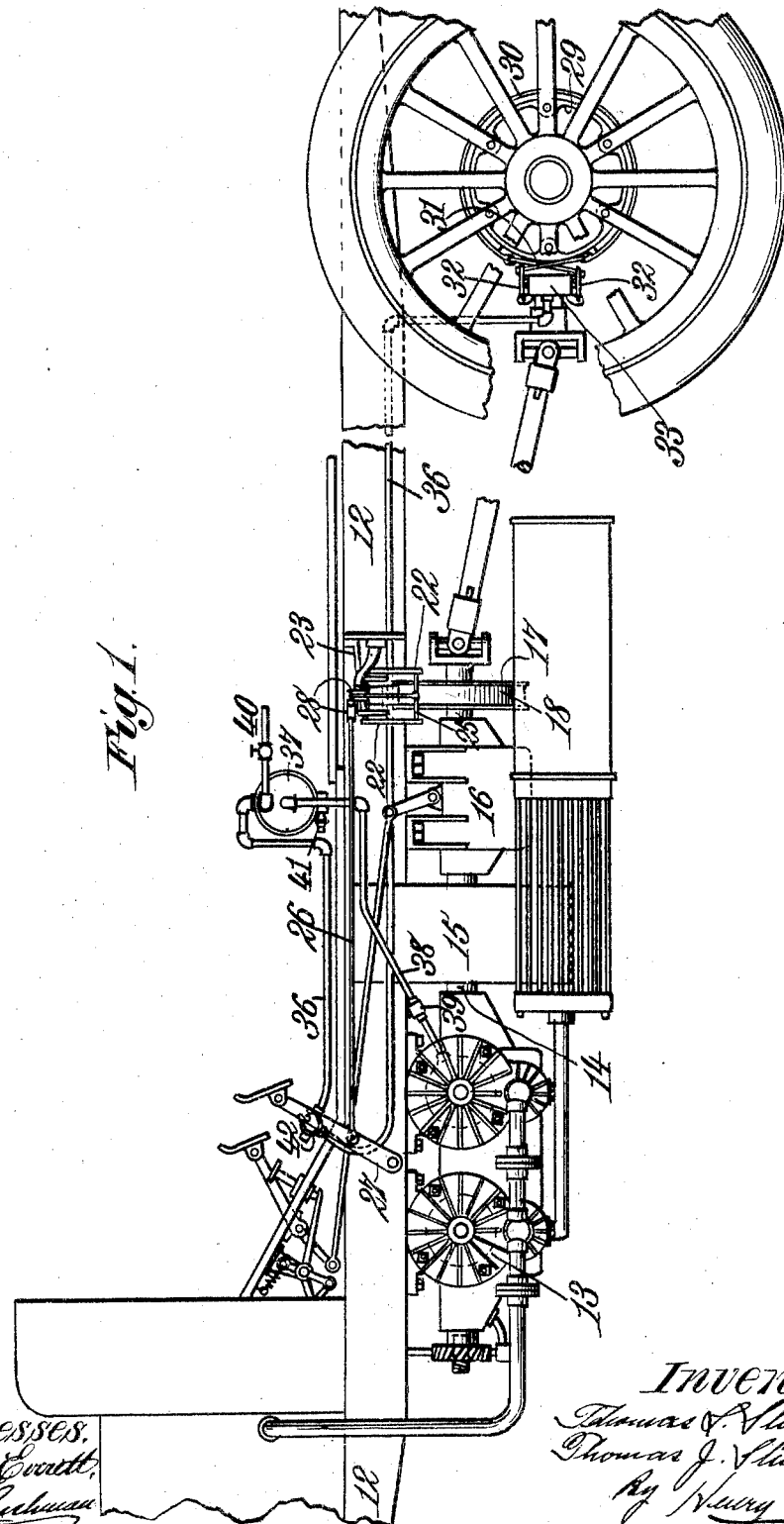

No. 784,015. PATENTED FEB. 28, 1905.
T. L. & T. J. STURTEVANT.
VEHICLE BRAKE.
APPLICATION FILED SEPT. 3, 1904.
2 SHEETS—SHEET 2.
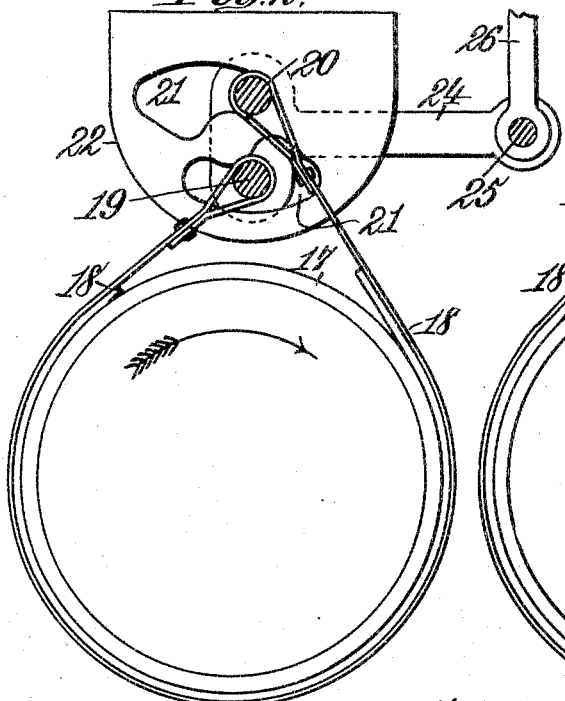
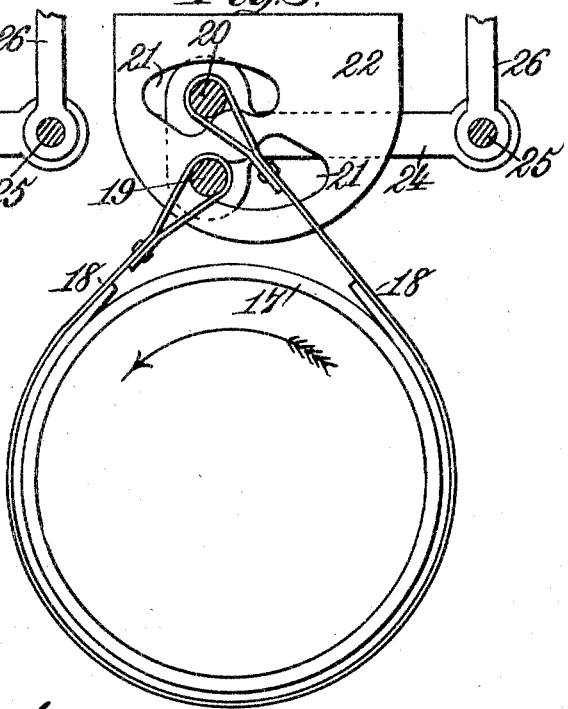
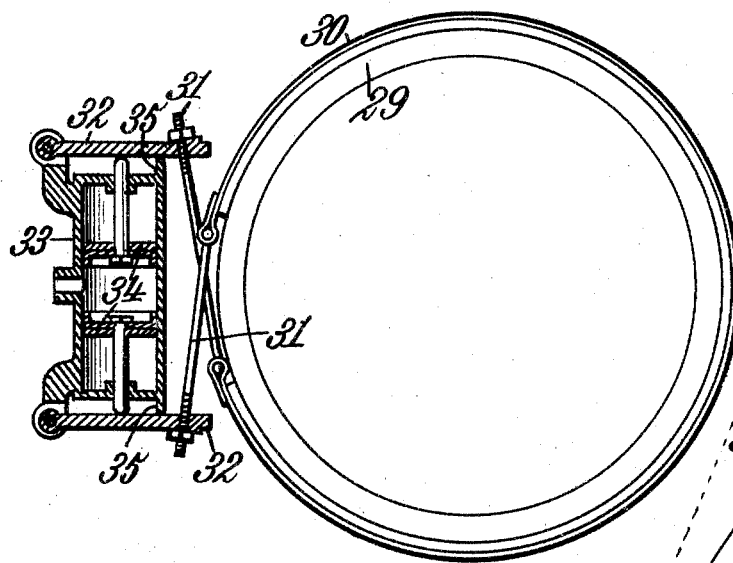
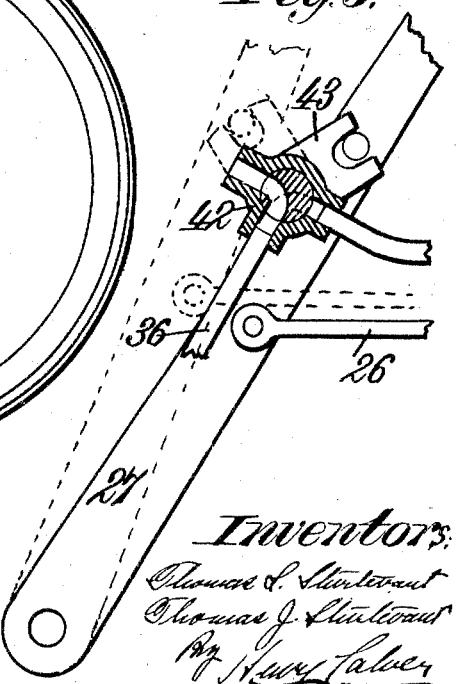
Witnesses.
Robert Everett
Inventors:
Thomas L. Sturtevant
Thomas J. Sturtevant
By Henry Calver
Atty.

No. 784,015.

Patented February 28, 1905.

UNITED STATES PATENT OFFICE.

THOMAS LEGGETT STURTEVANT, OF QUINCY, AND THOMAS JOSEPH STURTEVANT, OF WELLESLEY, MASSACHUSETTS.

VEHICLE-BRAKE.

SPECIFICATION forming part of Letters Patent No. 784,015, dated February 28, 1905.

Application filed September 3, 1904. Serial No. 223,248.

*To all whom it may concern:*

Be it known that we, THOMAS LEGGETT STURTEVANT, residing at Quincy, and THOMAS JOSEPH STURTEVANT, residing at Wellesley, in the county of Norfolk and State of Massachusetts, citizens of the United States, have invented certain new and useful Improvements in Vehicle-Brakes, of which the following is a specification, reference being had therein to the accompanying drawings.

The present invention relates to brakes for motor-vehicles, and is designed particularly for use on automobiles, in connection with which vehicle the invention will be shown and described; but it will be understood that the road-vehicle illustrated in the drawings and described hereinafter is merely for the purpose of illustration, and the use of the braking mechanism is not to be understood as limited to the particular vehicle shown, as it may be used wherever an easily-operated and highly-efficient braking apparatus for high-speed motors is desired.

The invention has for its object to provide manual and fluid-pressure (preferably a highly-elastic fluid, as air) operated brakes both of which are controlled from a single foot or controlling lever, the two brakes, which are of the strap-and-drum type, being so assembled and combined with relation to each other and the motor that the one supplements the action of the other, their action being so timed that preferably one acts slightly in advance of the other. Furthermore, failure of either one of the brakes to operate does not render the braking mechanism useless, since the mechanical brake and the fluid-pressure-operated brake are independent of each other to the extent that one will operate regardless of the condition of the other and the operator of the machine has always perfect braking control over the vehicle.

Another object of the invention is to improve upon the brake-band connections and operating devices so that the same brake efficiency is developed in the band no matter in which direction the rotating parts may be driven and whether the vehicle be traveling forward or backward the brake strap or band exerts the same action upon the brake-drum.

Other improvements will appear hereinafter, and in the claims appended hereunto we shall specify those features of our invention which we consider new.

In the drawings herewith we have shown one embodiment of our invention applied to an automobile, and in said drawings—

Figure 1 is a side view of so much of a chassis or automobile-frame as will serve to illustrate the application of our invention, the mechanical brake and the fluid-pressure brake, with their controlling foot-levers and operating connections, being illustrated in assembled condition. Figs. 2 and 3 are detail views of the mechanically-operated brake, showing the position of the parts when the brake-drum is rotating in opposite directions. Fig. 4 is a detail view showing the fluid-pressure brake. Fig. 5 is an enlarged detail view to show the three-way cock for controlling the fluid-pressure or power-operated brake shown in Fig. 4 and the connection of said cock with the foot controlling-lever.

Referring to the drawings by numerals, like numbers indicating like parts in the several views, 12 indicates the framework of an automobile having the underhung motor 13, the driving-shaft 14, the hollow clutch-containing fly-wheel 15, and the change-gear speed mechanism 16. Mounted on the shaft 14 (see Fig. 1) is a brake-drum 17 of the ordinary type, said brake-drum being encircled by the usual brake-band 18. Said brake-band is secured at its ends to two pins 19 and 20, which are mounted in slots 21 in hangers 22, secured, by means of a suitable bracket-arm 23, to the frame 12, as clearly shown in Fig. 1. The said pins 19 and 20 are secured to actuating-levers 24, connected at their outer ends by a cross-rod 25, from which cross-rod a flexible connection 26 extends to the controlling-lever 27, suitable guide-pulleys 28 being provided, over which the flexible connection 26 is led. The said controlling-lever 27 is shown in the present instance as a foot-lever, and while this is the preferred and most efficient form of controlling-lever it will be understood that by the term "controlling-lever" we mean any lever or equivalent brake-operating device under the immediate control of the operator.

Referring to the comparative showing in Figs. 2 and 3, the advantage of our novel manner of mounting the brake-band pins 19 and 20 in their supporting-plates 22 will be apparent. It will be seen that whichever way the brake-drum 17 may be rotated that brake-band pin (19 or 20, according to the direction of rotation of drum) against which the pull of the drum is acting will take a fixed bearing at the end of its slot 21, leaving the other pin free to move under the pull of the levers 24 and the brake connection. For example, in Fig. 2 the pin 20, which when the brake-drum 17 is rotating in the direction of the arrow shown in said figure is receiving the pull of the brake-band 18, becomes a fixed point of attachment for the brake-band, while in the position shown in Fig. 3, in which the brake-drum 17 is rotating in an opposite direction, the pin 19, which is receiving the pull of the brake-strap, is fixed. This construction has been found to be of great practical value, for the reason that the braking efficiency remains the same no matter in which direction the brake-drum may be rotating, and this shifting of the fixed point of attachment for the brake-band from one side to the other takes place automatically in accordance with the direction of rotation of the brake-drum and without requiring any attention on the part of the operator.

As above stated, the mechanically-operated brake is preferably mounted on the driving-shaft of the motor, and the fluid-pressure or power-operated brake, which will now be described, is shown as acting on the rear axle of the machine. It will be understood, however, that we do not tie ourselves to the particular disposition of the brakes shown, for it is obvious that their locations might be reversed or, in fact, that they could be mounted in operative relations to any part of the machine where it would be practicable to attach a brake.

Referring to Figs. 1 and 4, 29 indicates a brake-drum of the usual type which is secured to the rear wheel or axle of the machine, the said drum being surrounded by the usual band 30, said brake-band being secured at its ends to adjustable pull-rods 31, passing through the free ends of levers 32, which levers are pivoted at their outer ends to supporting-ears on the fluid-pressure cylinder 33, suitably supported on the machine-frame. The said pressure-cylinder 33 is provided with two pistons 34, the stems of which pass through the cylinder-heads and engage the levers 32, so that when the pistons 34 are moved outwardly by pressure within the cylinder the levers 32 will be operated to exert a pull upon the brake-strap 30. In order to secure the same uniformity of braking action in this fluid-pressure brake regardless of the direction of rotation of the brake-drum 29, we adopt the same principle that is utilized in the mechanically-operated brake above described. To this end stops 35 are provided, against which the free ends of the levers 32 take their bearing, and during operation of this fluid-pressure brake that lever 32 (according to direction of rotation of drum 29) which is receiving the pull of the brake-strap will rest upon its stop 35 and become the fixed point of attachment for the brake-band, while the other lever 32 will be forced outwardly under the action of the pressure-operated piston 34 and set the brake-band 30 upon the drum, and this same action will take place with absolute uniformity in whichever direction the drum 29 may be rotating.

In order to develop pressure within the cylinder 33, it is connected, by means of a pipe 36, with a pressure-tank 37, mounted in suitable and convenient position on the machine-frame, said tank 37 being shown in the present case as connected with one of the motor-cylinders by means of a pipe 38, provided with a check-valve 39, so that a suitable pressure may be at all times maintained within the tank 37. It will be apparent that in lieu of connecting the tank 37 to the motor-cylinder an independent air-pump could be provided to develop pressure. We preferably provide said tank 37 with a nozzle 40, to which may be attached a suitable hose for the purpose of inflating tires. At its bottom the tank 37 has the drain or blow-off cock 41, so that any matters of condensation which accumulate within the tank may be readily blown off and not carried to the brake-pistons or into the tires when they are being inflated from the tank. The said brake-pressure pipe 36 is provided with a three-way cock 42 between the brake-cylinder and the pressure-tank, (see Fig. 5,) the said cock having a controlling-lever 43 connected with the foot-lever 27 in any operative manner, as by the pin-and-slot connection shown in Fig. 5.

It will be seen that when the parts are in a position of rest the fluid-pressure-brake controlling-cock 42 will be open, as shown in Fig. 5 and the brake-cylinder 33 will be without pressure. Movement of the foot-lever 27 to braking position will not only operate the mechanical brake above described, but will throw the three-way cock 42 to the position shown in dotted lines in Fig. 5, throwing the pressure from the tank 37 into the brake-cylinder 33 and setting the fluid-pressure-operated brake.

From the foregoing it will be seen that a highly-efficient brake is provided and one in which by the combination of a mechanically-operated and a fluid-pressure brake, both operated by a single lever, the control of the machine is at all times perfect, and by reason of the shifting of the fixed points of attachment for the brake-bands according to the direction of rotation of the drums the same efficiency in braking action is secured no matter in which direction the brake-drums may be rotating.

Although we have described more or less precise forms and details of construction, we do not intend to be understood as limiting ourselves thereto, as we contemplate changes in form, in the proportion of parts, and the substitution of equivalents as circumstances may suggest or render expedient and without departing from the spirit of our invention.

Having thus described our invention, we claim—

1. In a motor-vehicle and in combination, a mechanical brake, an operating-lever to positively control said mechanical brake, a fluid-pressure brake, a source of pressure, a pressure-controlling valve, and connections between said lever and valve whereby movements of said mechanical brake-operating lever will throw on or cut off pressure for the fluid-pressure brake.

2. In a motor-vehicle and in combination, a mechanical brake, an operating-lever for said brake, a fluid-pressure brake, a source of pressure, a pressure-controlling valve having an operating-handle, and a pin or projection on said lever to engage said valve-handle and throw on or cut off pressure for said fluid-pressure brake as said lever is moved to set or release the mechanical brake.

3. In a motor-vehicle and in combination, a mechanical brake, a single brake-operating lever pivotally mounted on the vehicle-frame, a fluid-pressure brake, a source of pressure, a pressure-controlling valve having an operating-handle, and a pin or projection on said lever connected with said valve-handle so as to have a slight play relative thereto, whereby movement of said lever will first actuate said mechanical brake and then throw said valve to actuate said fluid-pressure brake.

4. In a motor-vehicle and in combination, a mechanical brake, a single brake-operating lever pivotally mounted on the vehicle-frame, a fluid-pressure brake, a source of pressure, a pressure-controlling valve having a slotted operating-handle, and a pin or projection on said lever engaging the slot in said valve-handle so as to have a slight play therein, whereby movement of said lever will first actuate said mechanical brake and then throw said valve to actuate said fluid-pressure brake.

5. In a motor-vehicle and in combination, a brake-drum, a brake-band encircling said drum, movable parts to which the ends of said brake-band are secured, stops against which one or the other of said movable parts takes a fixed bearing according to the direction of rotation of said drum, a fluid-pressure cylinder, and pistons in said cylinder to engage and move one or the other of said movable parts away from its stop and tighten the brake-band.

6. In a motor-vehicle and in combination, a brake-drum, a brake-band encircling said drum, a fluid-pressure cylinder, oppositely-movable pistons in said cylinder, levers mounted on said cylinder in operative relation to said pistons, said levers being connected with the ends of said brake-band, and stops against which one or the other of said levers takes a fixed bearing according to the direction of rotation of the said drum.

7. In a motor-vehicle and in combination, a brake-drum, a brake-band encircling said drum, a pressure-cylinder, oppositely-movable pistons in said cylinder, levers mounted at the opposite ends of said cylinder in operative relation to said pistons, said levers being connected with the ends of said brake-band, and stops on said cylinder adjacent the free ends of said levers against which one or the other of said levers takes a fixed bearing according to the direction of rotation of the said drum.

8. In a motor-vehicle and in combination, a mechanical brake, an operating-lever therefor, a fluid-pressure brake, a fluid-pressure supply, a three-way controlling-cock between said supply and said fluid-pressure brake, and connections between said three-way cock and said operating-lever whereby movements of said lever control said fluid-pressure-controlling cock.

9. In a motor-vehicle and in combination, a mechanical brake, a fluid-pressure brake, a single controlling-lever for said brakes, a fluid-pressure supply-tank, fluid-pressure connections between said supply-tank and said fluid-pressure brake, and an auxiliary hose-coupling on said supply-tank for tire inflation.

10. In a motor-vehicle and in combination, an engine-cylinder, a fluid-pressure tank connected therewith and receiving pressure therefrom, a fluid-pressure brake connected with said tank, a manually-operated pressure-controlling lever between said tank and said fluid-pressure brake, and auxiliary mechanical braking mechanism connected with and operated by said controlling-lever.

In testimony whereof we affix our signatures in presence of two witnesses.

THOMAS LEGGETT STURTEVANT.
THOMAS JOSEPH STURTEVANT.

Witnesses:
  W. T. ELLES,
  L. H. STURTEVANT.